(12) United States Patent
Amamori

(10) Patent No.: US 6,729,645 B2
(45) Date of Patent: May 4, 2004

(54) AUTOMOBILE HEAD PROTECTION DEVICE FOR VEHICLE OCCUPANT

(75) Inventor: Ichiro Amamori, Hikone (JP)

(73) Assignee: Takata Corporation, Tokyo (JP)

( * ) Notice: Subject to any disclaimer, the term of this patent is extended or adjusted under 35 U.S.C. 154(b) by 147 days.

(21) Appl. No.: 10/078,503

(22) Filed: Feb. 21, 2002

(65) Prior Publication Data

US 2002/0125696 A1 Sep. 12, 2002

(30) Foreign Application Priority Data

Mar. 6, 2001 (JP) .................................. 2001-062133

(51) Int. Cl.⁷ .............................................. B60R 21/22
(52) U.S. Cl. ................................ 280/730.2; 280/728.2
(58) Field of Search ......................... 280/730.2, 730.1, 280/736, 741, 801.2, 808, 728.2; B60R 21/22

(56) References Cited

U.S. PATENT DOCUMENTS

| | | | |
|---|---|---|---|
| 5,938,233 A | | 8/1999 | Specht ................. 280/730.2 |
| 6,059,311 A | * | 5/2000 | Wipasuramonton et al. ............... 280/729 |
| 6,152,482 A | * | 11/2000 | Patel et al. .............. 280/730.2 |
| 6,340,172 B1 | * | 1/2002 | Ohlert et al. ............. 280/730.2 |
| 6,364,346 B1 | * | 4/2002 | Preisler et al. ........... 280/730.2 |
| 6,409,211 B1 | * | 6/2002 | Sheng et al. ............. 280/730.2 |
| 6,435,545 B1 | * | 8/2002 | Osentoski et al. ........ 280/730.2 |
| 6,494,480 B2 | * | 12/2002 | Håland et al. ............. 280/729 |

FOREIGN PATENT DOCUMENTS

| | | |
|---|---|---|
| DE | 199 26 076 | 12/1999 |
| DE | 200 02 233 | 8/2000 |
| EP | 0 220 414 | 5/1987 |
| JP | 2000-280746 | 10/2000 |
| WO | 96/26087 | 8/1996 |

* cited by examiner

Primary Examiner—Brian L. Johnson
Assistant Examiner—Brian L Swenson
(74) Attorney, Agent, or Firm—Kanesaka & Takeuchi

(57) ABSTRACT

An automobile has a head protection device including a curtain-type airbag, wherein a distribution pipe inside the airbag does not interfere with any of projecting members on a peripheral side portion of a vehicle ceiling so that the airbag can be easily installed. The head protection device further includes an inflator for spouting gas into the pipe along a side rail of a vehicle body. The airbag are positioned not to interfere with a belt anchor stalk and a striker mounting bracket. To correspond this, the pipe inserted in the airbag is provided with a curved portion.

6 Claims, 6 Drawing Sheets

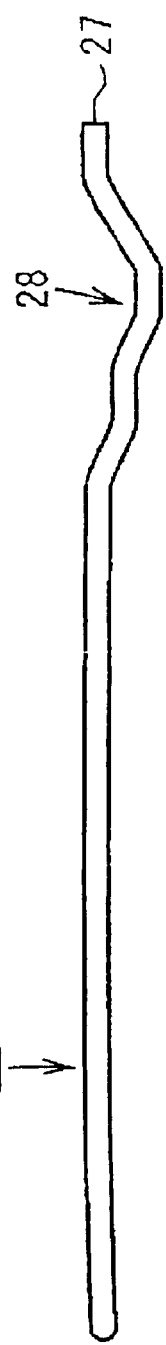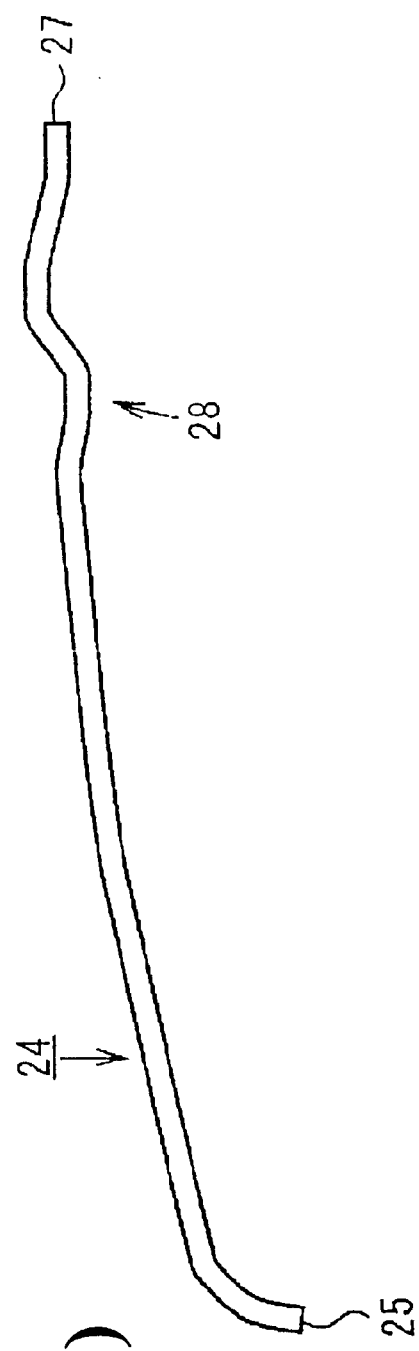
Fig. 5(a)
Fig. 5(b)

AUTOMOBILE HEAD PROTECTION DEVICE FOR VEHICLE OCCUPANT

BACKGROUND OF THE INVENTION AND RELATED ART STATEMENT

The present invention relates to an automobile with a head protection device for a vehicle occupant, having a curtain-type airbag which is inflatable along windows of side doors in the event of a side impact or rollover.

A head protection device having a curtain-type airbag, which is inflatable along the windows of side doors in the event of a side impact or rollover, is known from, for example, WO96/26087. A head protection device is also known, in which for achieving the distribution of gas into an airbag to inflate the airbag, a pipe is arranged in the airbag, and the pipe is formed with holes for allowing the gas to eject.

Seat belt devices for protecting vehicle occupants are well known. In case of a hard-top sedan, i.e. a sedan without B-pillar, in order to install a deflective fitting for a shoulder webbing for a driver or a front passenger, a belt anchor stalk is suspended from a side edge portion of a vehicle ceiling and the deflective fitting is fixed to the belt anchor stalk.

Japanese Unexamined Patent Publication (KOKAI) No. 2000-280746 discloses an automobile having bi-parting doors as shown in FIG. 6. That is, a front door 2 and a rear door 3, which open in a bi-parting manner, are disposed at a side of a vehicle body 1. The rear door 3 is hinged at a rear side thereof to the vehicle body 1. The front door 2 and the rear door 3 are adapted so that the rear edge of the front door 2 and the front edge of the rear door 3 are matched with each other.

The roof of the vehicle body 1 comprises left and right roof side members 4, a roof panel 5 and a reinforcing member (roof cross member) 6, which extend between the roof side members 4.

The roof side members 4 are provided with strikers 7 for latching the doors 2, 3. Similarly, floor side members are provided with strikers 8 for latching the doors 2, 3. The vehicle body 1 has A-pillars 10 and C-pillars 11, but does not have B-pillars.

In case where a curtain-type airbag with a gas distributing pipe is installed in a hard-top sedan or an automobile having bi-parting doors as shown in FIG. 6, since a belt anchor stalk for installing a deflective fitting, a roof cross member, and/or striker may be arranged to project from a roof side member, and/or a fixing member, such as bolts for mounting the strikers or the like, may be arranged to project from the roof side member, one or more of these projecting members may interfere with the pipe of the airbag.

It is an object of the present invention to provide a structure for allowing a curtain-type airbag with a pipe to be installed properly to a vehicle having such projecting members.

Further objects and advantage of the invention will be apparent from the following description of the invention.

SUMMARY OF THE INVENTION

An automobile of the present invention is equipped with a head protection device along a peripheral side portion of a vehicle ceiling, wherein the head protection device comprises a curtain-type airbag capable of deploying downwardly, a gas source for inflating the airbag, and a pipe arranged inside the airbag for distributing gas from the gas source to a chamber inside the airbag. A projecting member is disposed on the peripheral side portion of the vehicle ceiling, and the pipe has a curved portion bypassing the projecting member.

A head protection device for a vehicle occupant of the present invention comprises a curtain-type airbag capable of deploying downwardly from a peripheral side portion of a ceiling of an automotive vehicle, a gas source for inflating the airbag, and a pipe arranged inside the airbag for distributing gas from the gas source to a chamber inside the airbag. The pipe has a curved portion for bypassing a projecting member disposed on the peripheral side portion of the ceiling of the automobile.

In the automobile and the head protection device as mentioned above, since the pipe has the curved portion, the pipe does not interfere with any projecting member disposed on the peripheral side portion of the ceiling.

Therefore, the present invention allows a curtain-type airbag to be installed to the automobile without B-pillars, such as a hardtop sedan and an automotive vehicle having bi-parting doors. For example, even with a roof reinforcing member, belt anchor stalks for installing deflective fittings for seat belts, strikers for bi-parting doors, and/or fixing members, such as brackets and bolts, for mounting the strikers, the curtain-type airbag with the pipe can be installed. This increases the freedom in designing the automobile.

When the curtain-type airbag is positioned at an inner-cabin-side relative to the belt anchor stalk for mounting the deflective fitting, the curtain-type airbag deploys at inner-cabin-side relative to the deflective fitting for the seat belt.

BRIEF DESCRIPTION OF THE DRAWINGS

FIGS. 5(a) and 5(b) are views showing the structure of the pipe; and

DETAILED DESCRIPTION OF PREFERRED EMBODIMENTS

Figure 1A:
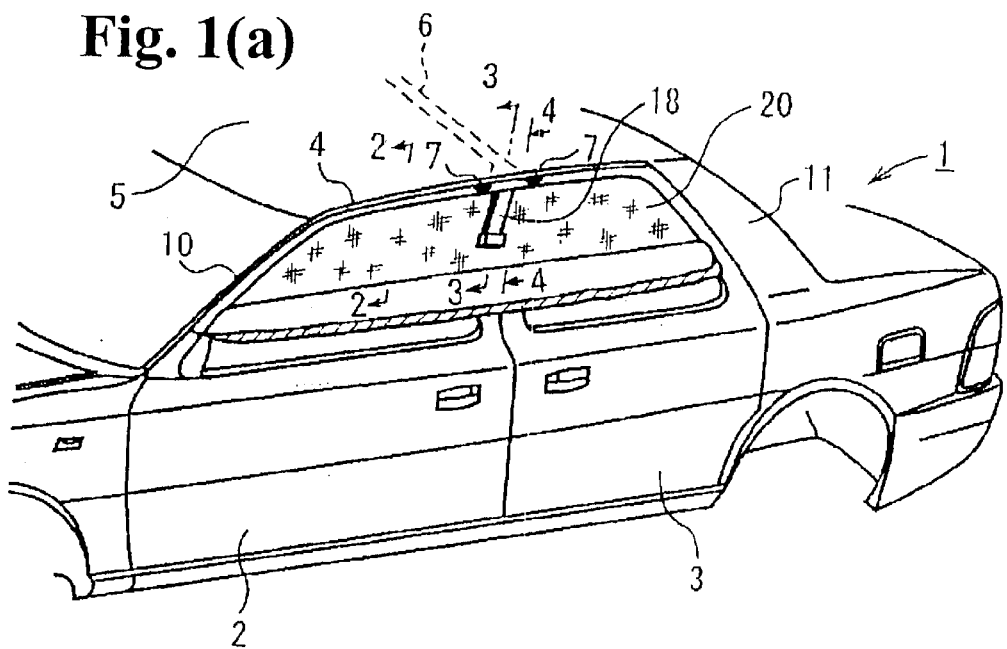
FIG. 1(a) is a perspective view of an automobile according to an embodiment.
Figure 1B:
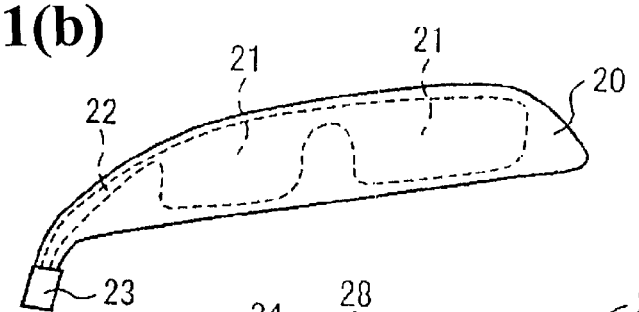
FIG. 1(b) is a side view of a curtain-type airbag.
Figure 1C:
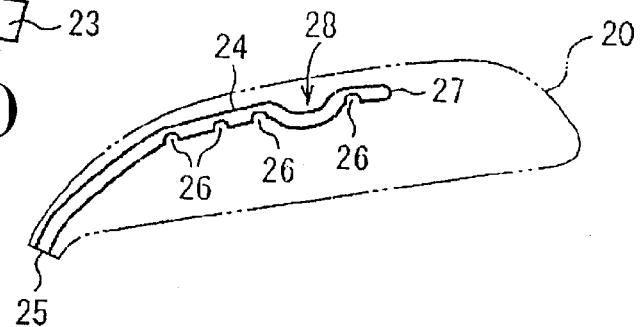
FIG. 1(c) is a side view schematically showing a pipe inside the curtain-type airbag.
Figure 2:
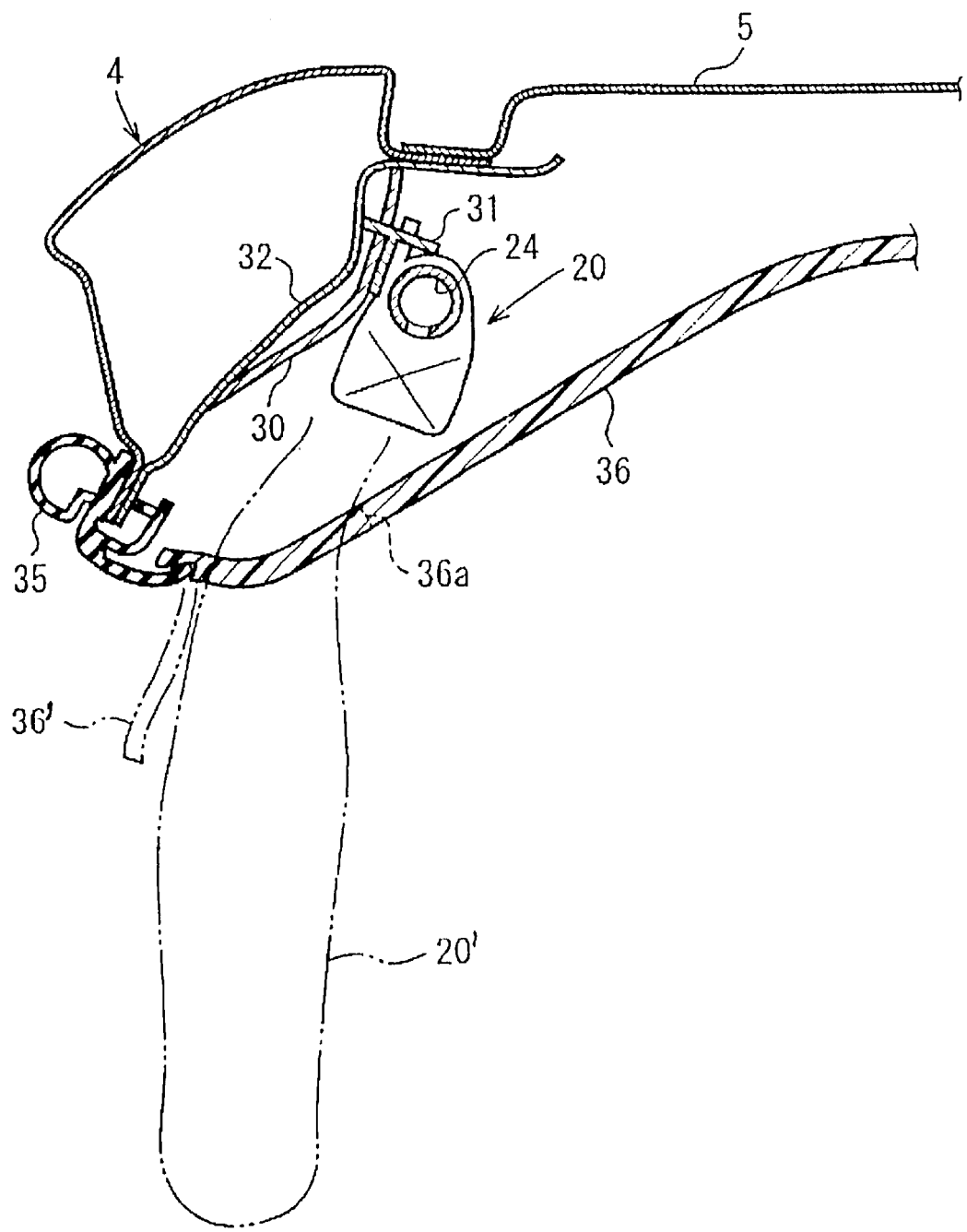
FIG. 2 is a sectional view taken along line 2—2 in FIG. 1(a)
Figure 3:
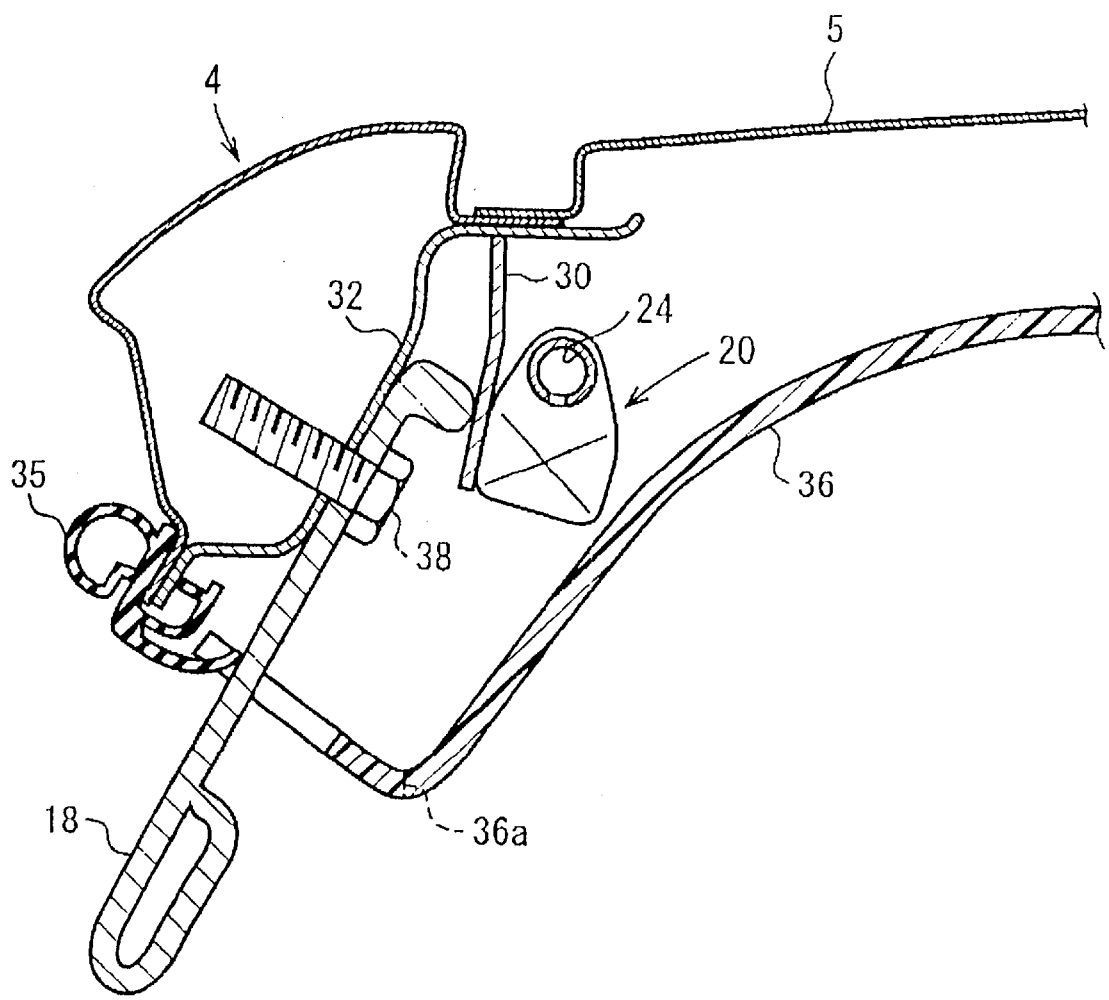
FIG. 3 is a sectional view taken along line 3—3 in FIG. 1(a)
Figure 4:
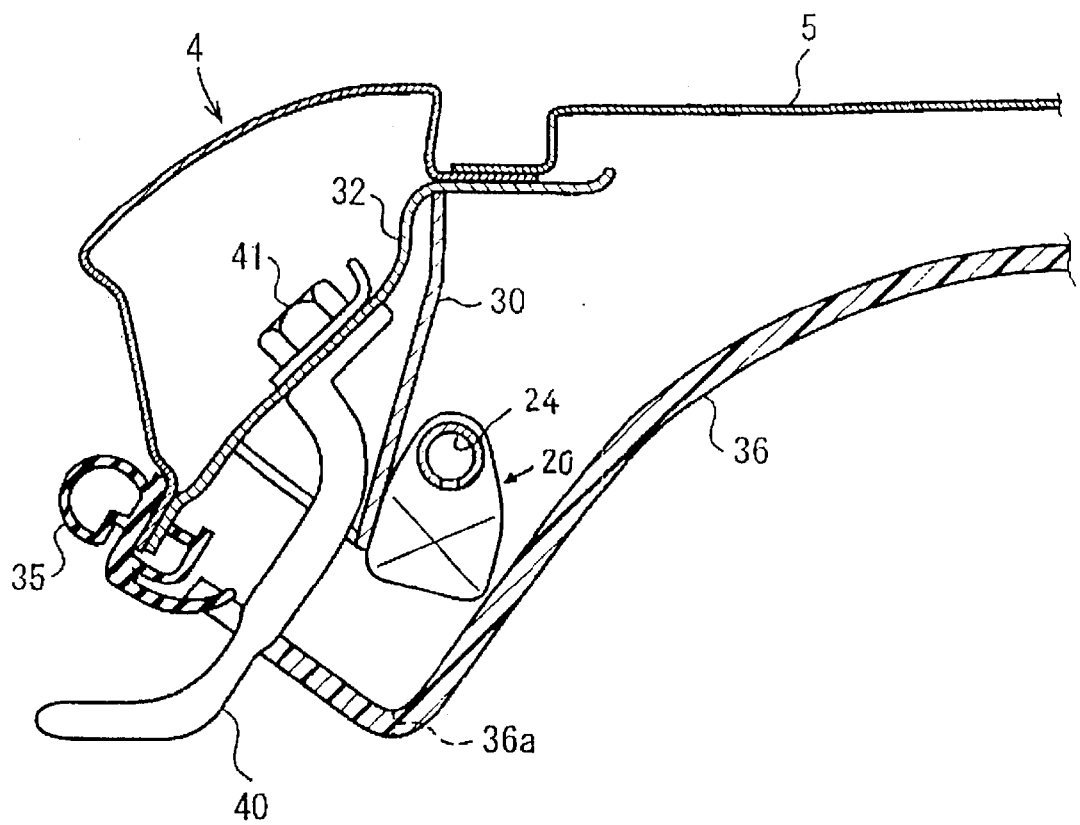
FIG. 4 is a sectional view taken along line 4—4 in FIG. 1(a)

Hereinafter, an embodiment of the present invention will be described with reference to the attached drawings. FIG. 1(a) is a perspective view of an automobile according to the embodiment (illustrations of upper parts of doors 2, 3 are omitted), FIG. 1(b) is a side view of a curtain-type airbag, and FIG. 1(c) is a side view schematically showing a pipe inside the curtain-type airbag. FIG. 2, FIG. 3 and FIG. 4 are sectional views taken along lines 2—2, 3—3 and 4—4 in FIG. 1(a), respectively, and FIGS. 5(a) and 5(b) are a plan view and a side view showing the details of the pipe.

Figure 6:
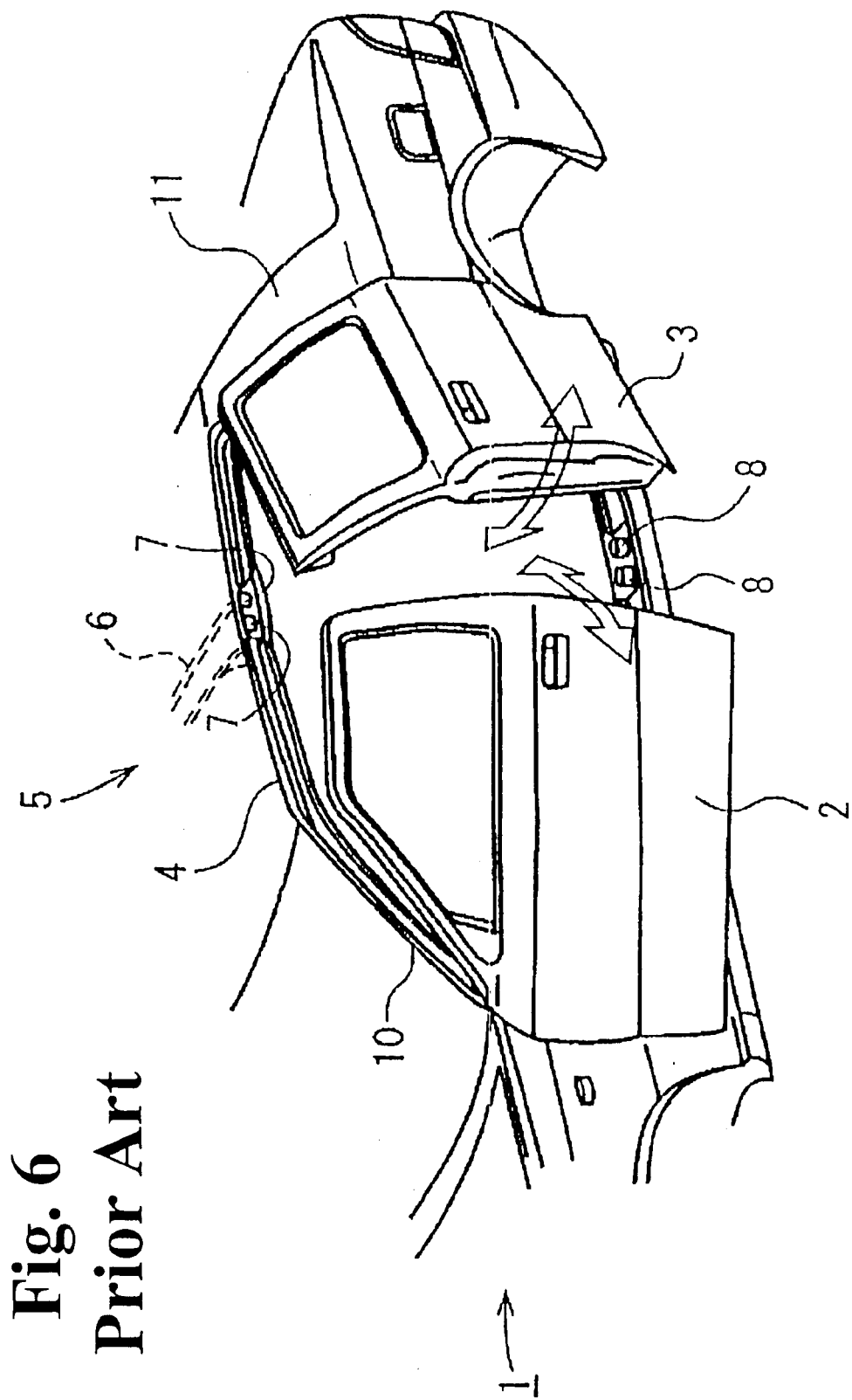
FIG. 6 is a perspective view of a conventional automobile having bi-parting doors.

The automobile shown in FIG. 1(a) has bi-parting doors just like the automobile shown in FIG. 6. The automobile comprises left and right roof side rails 4, a roof panel 5 and a reinforcing member (roof cross member) 6 which extend between the roof side rails 4. Strikers 7 for the doors 2, 3 are fixed to each roof side rail 4 via a bracket 40 (FIG. 4), and a belt anchor stalk 18 for installing a deflective fitting is fixed to each roof side rail 4. The belt anchor stalk 18 is positioned around the middle in the longitudinal direction of the roof side rail 4.

Incidentally, a shoulder webbing withdrawn from a seat belt retractor passes through an opening of the deflective fitting, but not illustrated. Also in this embodiment, the vehicle body 1 has A-pillars 10 and C-pillars, but does not have B-pillars.

A curtain-type airbag 20 is installed along the roof side rail 4 on a side edge of a ceiling in such a manner that the airbag 20 can deploy to extend between the A-pillar 10 and the C-pillar 11.

The curtain-type airbag 20 according to the embodiment is made by superposing a cabin-side sheet and a window-side sheet and sewing together the sheets to form a main air passage 22 and small chambers 21. The airbag 20 is provided with holes for mounting the airbag 20 to the roof side rail 4, the A-pillar 10, and the C-pillar 11 of the automotive vehicle, but not shown.

The main air passage 22 is formed to extend along a front portion of the airbag, which extends along the A-pillar 10. An upper portion of the main air passage 22 communicates with an upper portion of the front-side small chamber 21. A pipe 24 is inserted to extend through the main air passage 22 and upper portions of the small chambers 21. The pipe 24 is provided with a plurality of gas ports 26. The front end 25 of the pipe 24 is connected to an inflator (gas generator) 23 together with the front end of the airbag 20. Numeral 27 designates an opening at the rear end of the pipe 24.

The airbag 20 is installed such that the front portion thereof is accommodated along the A-pillar of the automobile in the folded state, and the middle and rear portions thereof are accommodated along the roof side rail 4 and the C-pillar 11 in the folded state. The folded airbag 20 is covered by a cover (not shown). The cover is adapted to be torn when the airbag 20 is inflated.

As shown in FIGS. 2, 3, and 4, a mounting member 30 of the airbag 20 is attached to extend along a roof side rail member 32 composing the roof side rail 4 and is fixed to the roof side rail member 32 by welding or the like. Brackets 31 attached to the airbag 20 are connected and secured to the mounting member 30.

A roof seal 35 is fitted to a lower side edge of the roof side rail 4. The ceiling of the vehicle cabin is composed of a headliner 36 extending along the lower surface of the roof panel 5. The airbag 20 is covered by the headliner 36.

The headliner 36 has a tear line 36a at a peripheral side portion thereof. When the airbag 20 is inflated as illustrated by a two-dot chain line 20' of FIG. 2, the peripheral side portion of the headliner 36 tears along the tear line 36a so as to open downwardly just as shown by numeral 36' of FIG. 2, whereby the airbag 20' deploys along the upper parts of the doors 2, 3.

As shown in FIG. 3, an upper portion of the belt anchor stalk 18 is fixed to the roof side rail member 32 by a bolt 38. The bracket 30 and the airbag 20 are positioned at more inner-cabin-side as compared to the bracket shown in FIG. 2 not to interfere with the belt anchor stalk 18 and the bolt 38.

As shown in FIG. 4, a striker mounting bracket 40 for mounting the strikers 7 is fixed to the roof side rail member 32 by a bolt 41. The bracket 30 extends downwardly longer than that shown in FIG. 2, so that the airbag 20 is located at a portion lower than that shown in FIG. 2.

To correspond to the configurations of the bracket 30 and the airbag 20 structured not to interfere with the belt anchor stalk 18 and the striker mounting bracket 40, the pipe 24 inserted in the airbag 20 is provided with a curved portion 28 as shown in FIGS. 5(a) and 5(b).

Because of this curved portion 28, the airbag 20 can be installed so that the pipe 24 does not interfere with the belt anchor stalk 18, the striker mounting bracket 40, and the bolts 38, 41.

Once the automobile equipped with such a head protection device as described above comes into a side collision or rolls over, the inflator 23 is activated to spout gas into the gas introduction pipe 24. The gas flows into the respective small chambers 21 through the gas ports 26 and the opening 27 at the rear end of the pipe 24, thereby inflating the small chambers 21. Accordingly, the airbag 20 is inflated downwardly to open the peripheral side portion of the headliner 36 as shown by the numeral 36' in FIG. 2, whereby the airbag 20 deploys along the doors 2, 3. The airbag 20 is tightly stretched between the A-pillar 10 and the C-pillar 11. Therefore, even when an occupant plunges into the airbag 20, the occupant can be securely received by the airbag 20 so that the occupant can be prevented from moving outside from the side window of the vehicle.

The above embodiment is just illustrative so that the present invention is not limited by the above embodiment. Though the above embodiment relates to an automobile having bi-parting doors 2, 3, the present invention can be applied to a hard-top sedan. In addition, though the inflator 23 is positioned at the A-pillar 10 side in the above embodiment, the inflator 23 may be positioned at the C-pillar 11 side. Also, though the airbag 20 has two small chambers 21, the airbag 20 may have only one chamber and may have three or more small chambers.

As described above, according to the automobile and the head protection device of the present invention, a curtain-type airbag can be easily installed without interference of a pipe relative to the projecting members on a peripheral side portion of a vehicle ceiling.

While the invention has been explained with reference to the specific embodiments of the invention, the explanation is illustrative and the invention is limited only by the appended claims.

What is claimed is:

1. An automobile, comprising:
   a body portion including a ceiling with a peripheral side portion, a projection member fixed to the peripheral side portion, and a mounting member fixed to the peripheral side portion to extend along an inner side thereof to have the projection member between the mounting member and the peripheral side portion, said mounting member having a portion adjacent the projection member and a portion away from the projection member, said portion adjacent the projection member having a height to the ceiling less than that of the portion away from the projection member, and
   a head protection device formed on the mounting member along the peripheral side portion and including a curtain airbag capable of deploying downwardly and having a chamber therein, a gas source for inflating the airbag, and a pipe arranged inside the airbag for distributing gas from the gas source to the chamber inside the airbag, said pipe being arranged along the mounting member and having a curved portion extending along the portion adjacent the projection member for bypassing said projection member.

2. An automobile according to claim 1, wherein said automobile has pillars except for B-pillars.

3. An automobile according to claim 1, wherein said projection member is at least one member selected from the group consisting of a reinforcing member of a roof, a belt anchor stalk for installing a deflective fitting for a seat belt, and a bracket for mounting strikers for bi-parting doors.

4. An automobile according claim 1, wherein said body portion has an inner-cabin-side, said airbag deploying at the inner-cabin-side relative to the projection member.

5. An automobile according to claim 1, wherein said body portion further includes a bolt for fixing the projection member to the peripheral side portion, said mounting member and said head projection device being located above the bolt at the portion adjacent the projection member.

6. An automobile according to claim 5, wherein said curved portion of the pipe is bent laterally and upwardly relative to the body portion.

* * * * *